(12) United States Patent
Han (10) Patent No.: US 12,177,708 B2
(45) Date of Patent: Dec. 24, 2024

(54) METHOD FOR MEASURING UNLICENSED BAND AND TERMINAL

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 370 days.

(21) Appl. No.: 17/692,547

(22) Filed: Mar. 11, 2022

(65) Prior Publication Data
US 2022/0201530 A1 Jun. 23, 2022

Related U.S. Application Data

(63) Continuation of application No. PCT/CN2020/108177, filed on Aug. 10, 2020.

(30) Foreign Application Priority Data

Sep. 12, 2019 (CN) .......................... 201910867048.5

(51) Int. Cl.
*H04W 24/10* (2009.01)
*H04B 17/318* (2015.01)
*H04L 5/00* (2006.01)

(52) U.S. Cl.
CPC .......... *H04W 24/10* (2013.01); *H04B 17/318* (2015.01); *H04L 5/0051* (2013.01)

(58) Field of Classification Search
CPC ..... H04L 5/0051; H04B 17/318; H04W 24/10
USPC ......................................................... 370/329
See application file for complete search history.

(56) References Cited

U.S. PATENT DOCUMENTS

| | | | |
|---|---|---|---|
| 2016/0037550 A1* | 2/2016 | Barabell | H04W 84/047 455/450 |
| 2016/0330641 A1 | 11/2016 | Zhang et al. | |
| 2016/0338019 A1* | 11/2016 | Ratasuk | H04L 5/006 |
| 2017/0094675 A1* | 3/2017 | Salem | H04W 72/542 |
| 2017/0127309 A1 | 5/2017 | Siomina et al. | |
| 2017/0347365 A1* | 11/2017 | Xu | H04W 24/10 |
| 2018/0324619 A1* | 11/2018 | Harada | H04W 24/10 |
| 2020/0084650 A1* | 3/2020 | Wang | H04L 5/0048 |
| 2021/0014893 A1* | 1/2021 | Park | H04B 17/318 |
| 2021/0058967 A1* | 2/2021 | Oteri | H04W 74/0808 |
| 2022/0022050 A1* | 1/2022 | Richards | H04W 74/08 |

FOREIGN PATENT DOCUMENTS

| | | |
|---|---|---|
| CN | 102624465 A | 8/2012 |
| CN | 103096368 A | 5/2013 |

OTHER PUBLICATIONS

International Search Report issued in corresponding international application No. PCT/CN2020/108177 dated Nov. 13, 2020.

* cited by examiner

*Primary Examiner* — Peter G Solinsky
(74) *Attorney, Agent, or Firm* — HAUPTMAN HAM, LLP (57) ABSTRACT

Provided are a method for measuring an unlicensed band and a terminal. The method includes: receiving uplink measurement configuration information, measuring an uplink unlicensed band to obtain a measurement result, and reporting the measurement result.

17 Claims, 5 Drawing Sheets

METHOD FOR MEASURING UNLICENSED BAND AND TERMINAL

CROSS-REFERENCE TO RELATED APPLICATION(S)

This application is a continuation of PCT/CN2020/108177, filed Aug. 10, 2020, which claims priority to Chinese patent application No. CN201910867048.5, filed Sep. 12, 2019, the entire disclosures of which are hereby incorporated by reference.

TECHNICAL FIELD

This disclosure relates to the field of communication technology, and particularly to a method for measuring an unlicensed band and a terminal.

BACKGROUND

With rapid increase in wireless data traffic, a licensed band may be unable to meet band requirements for communication. Deployment can be made on an unlicensed band to increase capacity. Communication systems deployed on the unlicensed band usually use or share a radio resource through contention. Various communication systems can all contend for and preempt resources.

In existing communication systems such as long term evolution (LTE), 5th generation (5G), etc., measurement of a link state by a terminal includes measurement of a reference signal receiving power (RSRP) and/or a reference signal receiving quality (RSRQ) of a downlink signal. When a reporting condition is satisfied, the terminal reports a measurement result to a network side, in order for the network side to make a radio resource management (RRM) decision such as mobility. However, in this manner, only a downlink signal is measured without considering quality of an uplink channel.

SUMMARY

To this end, the disclosure provides a method for measuring an unlicensed band, a terminal (also referred to as a terminal device), a network element, and a storage medium.

According to an aspect of the disclosure, a method for measuring an unlicensed band is provided. The method includes: receiving uplink measurement configuration information, measuring an uplink unlicensed band to obtain a measurement result, and reporting the measurement result.

In a possible implementation, the uplink measurement configuration information includes at least one of a measurement object, a measurement start condition, or a measurement report configuration. The measurement object indicates information of a frequency and/or band to be measured. The measurement start condition indicates a condition for starting measuring an uplink unlicensed band. The measurement report configuration indicates a measurement reporting condition and/or a measurement type.

In a possible implementation, measuring the uplink unlicensed band to obtain the measurement result includes: measuring an uplink unlicensed band of a serving cell according to the uplink measurement configuration information.

In a possible implementation, measuring the uplink unlicensed band to obtain the measurement result includes: measuring an uplink unlicensed band of a serving cell and an uplink unlicensed band of a neighbor cell according to the uplink measurement configuration information.

In a possible implementation, measuring the uplink unlicensed band to obtain the measurement result includes: starting measuring an uplink unlicensed band of a serving cell when the measurement start condition is satisfied.

In a possible implementation, measuring the uplink unlicensed band to obtain the measurement result includes: starting measuring an uplink unlicensed band of a serving cell and an uplink unlicensed band of a neighbor cell when the measurement start condition is satisfied.

In a possible implementation, starting measuring the uplink unlicensed band of the serving cell when the measurement start condition is satisfied includes: measuring a reference signal receiving power (RSRP) and/or a reference signal receiving quality (RSRQ) of a downlink reference signal of the serving cell, and starting measuring the uplink unlicensed band of the serving cell when the RSRP and/or the RSRQ of the downlink reference signal is lower than a first threshold.

In a possible implementation, starting measuring the uplink unlicensed band of the serving cell and the uplink unlicensed band of the neighbor cell when the measurement start condition is satisfied includes: measuring an RSRP and/or an RSRQ of a downlink reference signal of the serving cell, and starting measuring the uplink unlicensed band of the serving cell and the uplink unlicensed band of the neighbor cell when the RSRP and/or the RSRQ of the downlink reference signal is lower than a second threshold.

In a possible implementation, starting measuring the uplink unlicensed band of the serving cell when the measurement start condition is satisfied includes: measuring an RSRP and/or an RSRQ of an uplink reference signal of the serving cell, and starting measuring the uplink unlicensed band of the serving cell when the RSRP and/or the RSRQ of the uplink reference signal is lower than a third threshold.

In a possible implementation, starting measuring the uplink unlicensed band of the serving cell and the uplink unlicensed band of the neighbor cell when the measurement start condition is satisfied includes: measuring an RSRP and/or an RSRQ of an uplink reference signal of the serving cell, and starting measuring the uplink unlicensed band of the serving cell and the uplink unlicensed band of the neighbor cell when the RSRP and/or the RSRQ of the uplink reference signal is lower than a fourth threshold.

In a possible implementation, starting measuring the uplink unlicensed band of the serving cell and the uplink unlicensed band of the neighbor cell when the measurement start condition is satisfied includes: starting measuring a received signal strength indicator (RSSI) value of the uplink unlicensed band of the serving cell, after receiving the uplink measurement configuration information; and starting measuring the uplink unlicensed band of the neighbor cell when the RSSI value of the uplink unlicensed band is greater than a fifth threshold.

In a possible implementation, starting measuring the uplink unlicensed band of the serving cell and the uplink unlicensed band of the neighbor cell when the measurement start condition is satisfied includes: starting measuring a channel occupancy value of the uplink unlicensed band of the serving cell, after receiving the uplink measurement configuration information; and starting measuring the uplink unlicensed band of the neighbor cell when the channel occupancy value of the uplink unlicensed band is greater than a sixth threshold.

In a possible implementation, reporting the measurement result includes: reporting a measurement result of a serving cell.

In a possible implementation, reporting the measurement result includes: reporting the measurement result according to the measurement reporting condition.

In a possible implementation, when the measurement reporting condition is periodic reporting, reporting the measurement result according to the measurement reporting condition includes: reporting periodically the measurement result according to period information received.

In a possible implementation, when the measurement reporting condition is event triggered reporting, reporting the measurement result according to the measurement reporting condition includes: reporting a measurement result of an uplink unlicensed band of a serving cell and a measurement result of an uplink unlicensed band of a cell corresponding to an event when triggered by the event.

In a possible implementation, reporting the measurement result of the uplink unlicensed band of the serving cell and the measurement result of the uplink unlicensed band of the cell corresponding to the event when triggered by the event includes: reporting the measurement result of the uplink unlicensed band of the serving cell and a measurement result of an uplink unlicensed band of a cell corresponding to a downlink measurement event when triggered by the downlink measurement event.

In a possible implementation, reporting the measurement result of the uplink unlicensed band of the serving cell and the measurement result of the uplink unlicensed band of the cell corresponding to the event when triggered by the event includes: reporting the measurement result of the uplink unlicensed band of the serving cell and a measurement result of an uplink unlicensed band of a cell corresponding to a downlink measurement event while reporting a downlink measurement result, when triggered by the downlink measurement event.

In a possible implementation, reporting the measurement result of the uplink unlicensed band of the serving cell and the measurement result of the uplink unlicensed band of the cell corresponding to the event when triggered by the event includes: reporting the measurement result of the uplink unlicensed band of the serving cell and a measurement result of an uplink unlicensed band of a cell corresponding to an uplink measurement event when triggered by the uplink measurement event.

In a possible implementation, reporting the measurement result of the uplink unlicensed band of the serving cell and the measurement result of the uplink unlicensed band of the cell corresponding to the event when triggered by the event includes: reporting a measurement result of a downlink reference signal of the serving cell and a measurement result of a downlink reference signal of a cell corresponding to an uplink measurement event, while reporting the measurement result of the uplink unlicensed band of the serving cell and a measurement result of an uplink unlicensed band of the cell corresponding to the uplink measurement event when triggered by the uplink measurement event.

In a possible implementation, the measurement result includes at least one of: the RSSI value, the channel occupancy value, or an RSRQ value.

According to another aspect of the disclosure, a method for measuring an unlicensed band is provided. The method includes: transmitting uplink measurement configuration information, and receiving a measurement result of an uplink unlicensed band.

In a possible implementation, transmitting the uplink measurement configuration information includes: transmitting the uplink measurement configuration information through a radio resource control (RRC) message.

In a possible implementation, the uplink measurement configuration information includes at least one of a measurement object, a measurement start condition, or a measurement report configuration. The measurement object indicates information of a frequency and/or band to be measured. The measurement start condition indicates a condition for starting measuring an uplink unlicensed band. The measurement report configuration indicates a measurement reporting condition and/or a measurement type.

In a possible implementation, receiving the measurement result of an uplink unlicensed band includes: receiving a measurement result of an uplink unlicensed band of a serving cell according to the uplink measurement configuration information.

In a possible implementation, receiving the measurement result of an uplink unlicensed band includes: receiving a measurement result of an uplink unlicensed band of a serving cell and a measurement result of an uplink unlicensed band of a neighbor cell according to the uplink measurement configuration information.

In a possible implementation, receiving the measurement result of an uplink unlicensed band includes: receiving the measurement result of an uplink unlicensed band according to the measurement reporting condition.

In a possible implementation, when the measurement reporting condition is periodic reporting, receiving the measurement result of an uplink unlicensed band according to the measurement reporting condition includes: receiving periodically the measurement result of an uplink unlicensed band in case of the periodic reporting.

In a possible implementation, when the measurement reporting condition is event triggered reporting, receiving the measurement result of an uplink unlicensed band according to the measurement reporting condition includes: receiving a measurement result of an uplink unlicensed band of a serving cell and a measurement result of an uplink unlicensed band of a cell corresponding to an event in case of reporting triggered by the event.

In a possible implementation, receiving the measurement result of the uplink unlicensed band of the serving cell and the measurement result of the uplink unlicensed band of the cell corresponding to the event in case of reporting triggered by the event includes: receiving the measurement result of the uplink unlicensed band of the serving cell and a measurement result of an uplink unlicensed band of a cell corresponding to a downlink measurement event in case of trigger by the downlink measurement event.

In a possible implementation, receiving the measurement result of the uplink unlicensed band of the serving cell and the measurement result of the uplink unlicensed band of the cell corresponding to the event in case of reporting triggered by the event includes: receiving the measurement result of the uplink unlicensed band of the serving cell and a measurement result of an uplink unlicensed band of a cell corresponding to a downlink measurement event while receiving a downlink measurement result, in case of trigger by the downlink measurement event.

In a possible implementation, receiving the measurement result of the uplink unlicensed band of the serving cell and the measurement result of the uplink unlicensed band of the cell corresponding to the event in case of reporting triggered by the event includes: receiving the measurement result of the uplink unlicensed band of the serving cell and a measurement result of an uplink unlicensed band of a cell corresponding to an uplink measurement event in case of trigger by the uplink measurement event.

In a possible implementation, receiving the measurement result of the uplink unlicensed band of the serving cell and the measurement result of the uplink unlicensed band of the cell corresponding to the event in case of reporting triggered by the event includes: receiving a measurement result of a downlink reference signal of the serving cell and a measurement result of a downlink reference signal of a cell corresponding to an uplink measurement event, while receiving the measurement result of the uplink unlicensed band of the serving cell and a measurement result of an uplink unlicensed band of the cell corresponding to the uplink measurement event in case of trigger by the uplink measurement event.

In a possible implementation, the measurement result of an uplink unlicensed band includes at least one of: an RSSI value, a channel occupancy value, or an RSRQ value.

According to another aspect of the disclosure, a terminal device is provided. The terminal device includes a receiving module, a measuring module, and a reporting module. The receiving module is configured to receive uplink measurement configuration information. The measuring module is configured to measure an uplink unlicensed band to obtain a measurement result. The reporting module is configured to report the measurement result.

According to another aspect of the disclosure, a network-element device is provided. The network-element device includes a transmitting module and a measurement-result receiving module. The transmitting module is configured to transmit uplink measurement configuration information. The measurement-result receiving module is configured to receive a measurement result of an uplink unlicensed band.

According to another aspect of the disclosure, a terminal device is provided. The terminal device includes a processor and a memory. The memory is configured to store instructions executable by the processor. The processor is configured to implement the method described above.

According to another aspect of the disclosure, a network-element device is provided. The network-element device includes a processor and a memory. The memory is configured to store instructions executable by the processor. The processor is configured to implement the method described above.

According to another aspect of the disclosure, a non-transitory computer readable storage medium is provided. The non-transitory computer readable storage medium is configured to store computer program instructions which, when executed by a processor, are operable with the processor to implement the method described above.

Other features and aspects of the disclosure will become apparent from the following elaboration of exemplary implementations with reference to the accompanying drawings.

BRIEF DESCRIPTION OF THE DRAWINGS

The accompanying drawings that are included in and constitute a part of the description, together with the description, illustrate exemplary implementations, features, and aspects of the disclosure, and are intended for explaining the principles of the disclosure.

DETAILED DESCRIPTION

Various exemplary implementations, features, and aspects of the disclosure will be described in detail below with reference to the accompanying drawings. The same reference numerals in the drawings represent elements with the same or similar functions. Although various aspects of the implementations are illustrated in the drawings, it is not necessary to draw the drawings to scale unless specifically noted.

The term "exemplary" herein means "as an example, implementation, or illustrative". Any implementation described herein as "exemplary" need not be interpreted as superior to or better than other implementations.

In addition, in order to better illustrate the disclosure, many specific details are given in the following specific implementations. Those skilled in the art should understand that the disclosure can still be implemented without some specific details. In some examples, methods, means, elements, and circuits well-known to those skilled in the art are not described in detail in order to highlight the subject matter of the disclosure.

With rapid increase in wireless data traffic, a licensed band may be unable to meet band requirements for communication. Deployment can be made on an unlicensed band to increase capacity. When a base station makes a decision such as switching, multi-connection, or the like, a terminal is required to report a measurement result. How the terminal can measure various types of cells (such as a new type of cell where an uplink band resource is a band resource of an unlicensed band and a downlink band resource is a band resource of a licensed band) and how the terminal can measure a neighbor cell are problems to be solved.

In some embodiments, measurement of a link state by the terminal includes measurement of a reference signal receiving power (RSRP) and/or a reference signal receiving quality (RSRQ) of a downlink signal. When a reporting condition is satisfied, the terminal reports a measurement result to a network side, in order for the network side to make a radio resource management (RRM) decision. In this manner, only a downlink signal is measured without considering quality of an uplink channel. In the disclosure, an uplink resource of an unlicensed band is measured, and a downlink signal can also be measured, which can provide sufficient measurement information to the network side in order for the network side to make an RRM decision.

The following will elaborate solutions for unlicensed band measurement provided in the disclosure with reference to the accompanying drawings.

Figure 1:
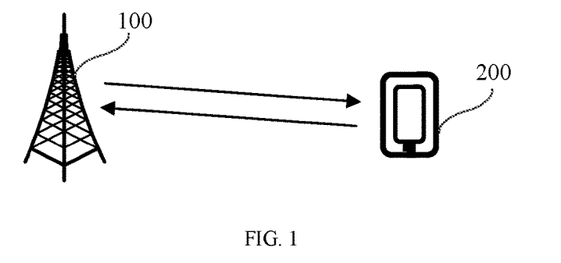
FIG. 1 is a schematic structural diagram of a mobile communication system according to an implementation of the disclosure.

FIG. 1 is a schematic structural diagram of a mobile communication system according to an implementation of the disclosure. As illustrated in FIG. 1, the mobile communication system may include a network-element device 100 and a terminal device 200. The mobile communication system to which implementations of the disclosure are applicable may be a 5th generation (5G) communication system, or may be a 4G communication system or 3G communication system, or may be various future communication systems such as 6G, 7G, or the like, which is not limited herein. Implementations of the disclosure are also applicable to various network architectures, which include, but are not limited to, a relay network architecture, a dual-connectivity architecture, a vehicle-to-everything (V2X) architecture, etc.

The network-element device 100 may be a base station (BS) and may also be referred to as a base station device. The network-element device 100 is a device for providing a wireless communication function that is deployed in a radio access network (RAN). For example, a device for providing a base station function in a 2nd generation (2G) network includes a base transceiver station (BTS). A device for providing a base station function in a 3G network includes a NodeB. A device for providing a base station function in a 4G network includes an evolved NodeB (eNB). A device for providing a base station function in a wireless local area network (WLAN) is an access point (AP). A device for providing a base station function in 5G new radio (NR) is a gNB and an ng-eNB. The gNB and the terminal communicate with each other through NR technology, and the ng-eNB and the terminal communicate with each other through evolved universal terrestrial radio access (E-UTRA) technology. The gNB and the ng-eNB each can be connected to a 5G core network. The base station in implementations of the disclosure further includes a device for providing a base station function in a future communication system.

A base station controller in implementations of the disclosure is a device for managing the base station, such as a base station controller (BSC) in a 2G network, a radio network controller (RNC) in a 3G network, and may also refer to a device for controlling and managing the base station in a future communication system. A network side refers to a communication network for providing communication services to the terminal, and includes a base station of RAN, or may include a base station controller of RAN, or may include a device at a core-network side. A core network may be an evolved packet core (EPC), a 5G core network, or may be a new type of core network in a future communication system. The 5G core network includes a set of devices, and implements an access and mobility management function (AMF) for functions such as mobility management, a user plane function (UPF) that provides functions such as packet routing and forwarding and quality of service (QoS) management, a session management function (SMF) that provides functions such as session management and IP address allocation and management, and the like. EPC can include a mobility management entity (MME) that provides functions such as mobility management and gateway selection, a serving gateway (S-GW) that provides functions such as packet forwarding, and PDN gateway (P-GW) that provides functions such as terminal address allocation and rate control.

The terminal device 200 may refer to various user equipment (UE), access terminal devices, subscriber units, subscriber stations, mobile stations (MS), remote stations, remote terminal devices, mobile devices, user terminals, terminal equipment, wireless communication devices, user agents, or user devices. The terminal device 200 may also be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, a terminal device in the future evolved public land mobile network (PLMN), etc. Implementations of the disclosure are not limited in this regard.

It is defined in implementations of the disclosure that, one-way communication link from an access network to the terminal is a downlink, data transmitted on the downlink is downlink data, and a transmission direction of the downlink data is referred to as a downlink direction; on the contrary, one-way communication link from the terminal to the access network is an uplink, data transmitted on the uplink is uplink data, and a transmission direction of the uplink data is referred to as an uplink direction.

It is to be noted that, the mobile communication system illustrated in FIG. 1 may include multiple network-element devices and/or multiple terminal devices. FIG. 1 illustrates one network-element device and one terminal device as an example for explanation, but implementations of the disclosure are not limited in this regard.

It is to be noted that, in implementations of the disclosure, when a cell adopts time division duplexing (TDD), the uplink and the downlink use the same band and bandwidth, and a measurement result of the downlink is equivalent to that of the uplink, that is, they correspond to the same measurement result.

Figure 2:
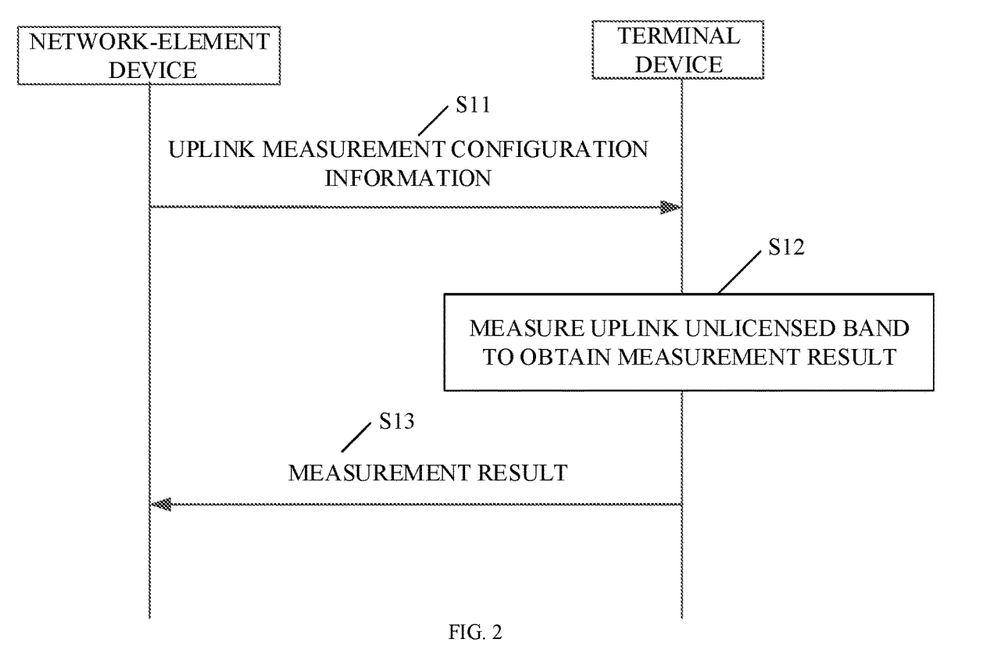
FIG. 2 is a flowchart of a method for measuring an unlicensed band according to an implementation of the disclosure.

FIG. 2 is a flowchart of a method for measuring an unlicensed band according to an implementation of the disclosure, the method can realize measurement of an uplink resource of an unlicensed band, thereby providing sufficient measurement information to a network side in order for the network side to make a radio resource management (RRM) decision. As illustrated in FIG. 2, the method is applicable to a terminal device and may include the following steps.

In S11, the terminal device receives uplink measurement configuration information transmitted by a network-element device.

The network-element device (such as base station) configures the uplink measurement configuration information for the terminal device. For example, the base station may transmit the uplink measurement configuration information through a radio resource control (RRC) message, and the terminal device may receive the uplink measurement configuration information through the RRC message. The uplink measurement configuration information may include one or more of a measurement object, a measurement start condition, and a measurement report configuration. The measurement object may indicate information of a frequency and/or band to be measured. The measurement start condition may indicate a condition for the terminal device to start measuring an uplink unlicensed band. The measurement report configuration may indicate a measurement reporting condition and/or a measurement type. Exemplarily, the measurement reporting condition described above may include at least one of periodic reporting or event triggered reporting. The measurement type may include at least one of: a received signal strength indicator (RSSI) value, a channel occupancy value, or an RSRQ value. The channel occupancy value refers to a percentage of sampling values exceeding a channel occupancy threshold among sampling values of the RSSI value measured within a particular time interval (the value of the time interval may be notified to the terminal device by a network side, or may be specified in a protocol).

In S12, the terminal device measures an uplink unlicensed band to obtain a measurement result.

Once receiving the uplink measurement configuration information, the terminal device can measure the uplink unlicensed band to obtain a measurement result of the uplink unlicensed band, according to the uplink measurement configuration information. Exemplarily, the terminal device can measure an uplink unlicensed band of the measurement object according to the measurement object and the measurement type (for example, measurements such as RSSI, RSRQ) in the uplink measurement configuration information, to obtain a measurement result of one or more measurement types, thereby realizing measurement of an uplink band resource.

In a possible implementation, once receiving the uplink measurement configuration information described above, the terminal device can measure an uplink unlicensed band of a serving cell according to the uplink measurement configuration information; alternatively, the terminal device can measure an uplink unlicensed band of a serving cell and an uplink unlicensed band of a neighbor cell according to the uplink measurement configuration information. As such, it is possible to measure uplink band resources of various types of cells as well as the neighbor cell.

In a possible implementation, when the measurement start condition in the uplink measurement configuration information is satisfied, the terminal device can start measuring an uplink unlicensed band. Specifically, when the measurement start condition is satisfied, the terminal device may start measuring an uplink unlicensed band of a serving cell, or may start measuring an uplink unlicensed band of a serving cell and an uplink unlicensed band of a neighbor cell. As such, by configuring a start condition for measuring the uplink unlicensed band, the terminal device can measure an unlicensed band when necessary, which not only meets requirements for measurement but also is conducive to power saving of a terminal.

For example, if the uplink measurement configuration information received by the terminal device contains the measurement start condition, the terminal device determines whether the start condition is satisfied, and if the start condition is satisfied, the terminal device starts measuring the uplink unlicensed band of the serving cell or the uplink unlicensed band of the neighbor cell. If the uplink measurement configuration information does not contain the measurement start condition (that is, the network side has not configured a condition for measuring the uplink unlicensed band), the terminal device starts measuring the uplink unlicensed band of the serving cell after receiving the uplink measurement configuration information. Meanwhile, if measurement of the uplink unlicensed band of the neighbor cell is configured in the uplink measurement configuration information, the terminal device can further start measuring the uplink unlicensed band of the neighbor cell.

In S13, the terminal device reports the measurement result to the network-element device.

After measuring the uplink unlicensed band and obtaining the measurement result, the terminal device may report to the base station a measurement result of the serving cell, or may report a measurement result of the serving cell and a measurement result of the neighbor cell. The measurement result may include at least one of: the RSSI value, the channel occupancy value, or the RSRQ value.

In a possible implementation, the terminal device can report the measurement result according to the measurement reporting condition in the uplink measurement configuration information. For example, the terminal device may report the measurement result periodically, or may report when triggered by an event (event-triggered reporting). In this way, the terminal device can report the measurement result when required by the base station, which not only meets requirements of the base station but also is conducive to power saving of a terminal.

For example, if the uplink measurement configuration information received by the terminal device indicates the measurement reporting condition, the terminal device determines whether the reporting condition is satisfied, and when the reporting condition is satisfied, the terminal device reports the measurement result to the base station, such as the measurement result of the serving cell. If the uplink measurement configuration information does not indicate the measurement reporting condition, after obtaining the measurement result, the terminal device directly reports the measurement result of the serving cell to the base station, and meanwhile can further report the measurement result of the neighbor cell.

In this way, the terminal device receives the uplink measurement configuration information, measures the uplink unlicensed band to obtain the measurement result, and reports the measurement result. According to the method for measuring an unlicensed band in the foregoing implementations of the disclosure, it is possible to measure an uplink resource of the unlicensed band and report the measurement result of the uplink unlicensed band, thereby providing sufficient measurement information to the network side in order for the network side to make RRM decision such as switching decision, multi-connection processing, etc.

Based on that, implementations of the disclosure further provide a process of measuring the uplink unlicensed band at S12. In case the uplink measurement configuration information contains the measurement start condition, the terminal device starts measuring the uplink unlicensed band when the measurement start condition is satisfied.

Figure 3:
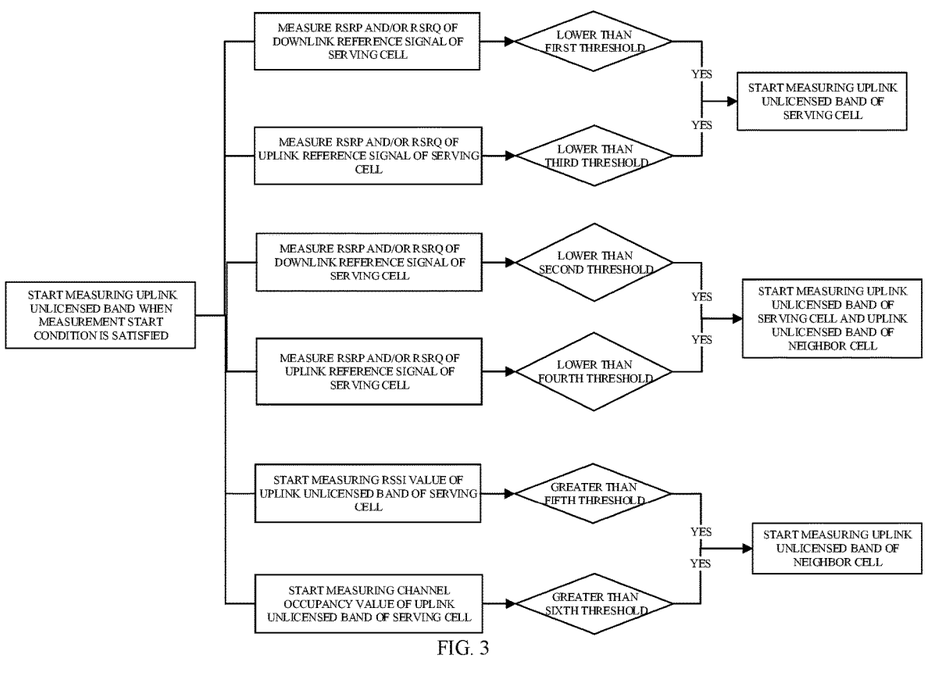
FIG. 3 is a flowchart of a method for measuring an unlicensed band according to an implementation of the disclosure.

FIG. 3 is a flowchart of a method for measuring an unlicensed band according to an implementation of the disclosure. As illustrated in FIG. 3, the terminal device is in a connected mode in the serving cell. The terminal device receives a measurement start condition configured by the network side (such as base station), where the start condition contains a condition for the terminal device to start measuring the uplink unlicensed band. Exemplarily, a measurement start condition of the uplink unlicensed band may be one or more thresholds (such as a first threshold, a second threshold, a third threshold, a fourth threshold, a fifth threshold, and a sixth threshold illustrated in FIG. 3). The terminal device can start measuring the uplink unlicensed band of the serving cell or start measuring the uplink unlicensed band of the serving cell and the uplink unlicensed band of the neighbor cell, according to whether these threshold values are satisfied.

In a possible implementation, the measurement start condition of the uplink unlicensed band may be one threshold s-MeasureConfig1. If the quality of a downlink reference signal (RSRP or RSRQ) measured of serving cell 1 is lower than the threshold s-MeasureConfig1, the terminal device starts measuring the uplink unlicensed band. In addition, the terminal device can start measuring the uplink unlicensed band of the serving cell, or start measuring the uplink unlicensed band of the serving cell and the uplink unlicensed band of the neighbor cell.

For example, the terminal device can measure an RSRP and/or an RSRQ of a downlink reference signal of the serving cell. When the RSRP and/or the RSRQ of the downlink reference signal is lower than the first threshold, the terminal device starts measuring the uplink unlicensed band of the serving cell. In addition, the terminal device can measure the RSRP and/or the RSRQ of the downlink reference signal of the serving cell. When the RSRP and/or the RSRQ of the downlink reference signal is lower than the second threshold, the terminal device starts measuring the uplink unlicensed band of the serving cell and the uplink unlicensed band of the neighbor cell.

In a possible implementation, the measurement start condition of the uplink unlicensed band may be one threshold s-MeasureConfig2. If the quality of an uplink reference signal (RSRP or RSRQ) of serving cell 1 measured by the terminal device is lower than the threshold s-MeasureConfig2, the terminal device starts measuring the uplink unlicensed band. In addition, the terminal device can start measuring the uplink unlicensed band of the serving cell, or start measuring the uplink unlicensed band of the serving cell and the uplink unlicensed band of the neighbor cell.

For example, the terminal device can measure an RSRP and/or an RSRQ of an uplink reference signal of the serving cell. When the RSRP and/or the RSRQ of the uplink reference signal is lower than the third threshold, the terminal device starts measuring the uplink unlicensed band of the serving cell. In addition, the terminal device can measure the RSRP and/or the RSRQ of the uplink reference signal of the serving cell. When the RSRP and/or the RSRQ of the uplink reference signal is lower than the fourth threshold, the terminal device starts measuring the uplink unlicensed band of the serving cell and the uplink unlicensed band of the neighbor cell.

In a possible example, the measurement start condition of the uplink unlicensed band may be one threshold s-MeasureConfig3. The terminal device starts measurement of an uplink unlicensed band of serving cell 1 once receiving measurement configuration information. If an RS SI value measured of the uplink unlicensed band of the serving cell is greater than the threshold s-MeasureConfig3, the terminal device starts measuring the uplink unlicensed band of the neighbor cell.

For example, after receiving the uplink measurement configuration information, the terminal device starts measuring an RSSI value of the uplink unlicensed band of the serving cell. When the RSSI value of the uplink unlicensed band is greater than the fifth threshold, the terminal device starts measuring the uplink unlicensed band of the neighbor cell.

In a possible implementation, the measurement start condition of the uplink unlicensed band may be one threshold s-MeasureConfig4. The terminal device starts measurement of an uplink unlicensed band of serving cell 1 once receiving measurement configuration information. If a channel occupancy value measured of the uplink unlicensed band of the serving cell is greater than the threshold s-MeasureConfig4, the terminal device starts measuring the uplink unlicensed band of the neighbor cell.

For example, after receiving the uplink measurement configuration information, the terminal device starts measuring a channel occupancy value of the uplink unlicensed band of the serving cell. When the channel occupancy value of the uplink unlicensed band is greater than the sixth threshold, the terminal device starts measuring the uplink unlicensed band of the neighbor cell.

As such, by configuring for the terminal device the measurement start condition of the uplink unlicensed band, the terminal device can measure an unlicensed band when necessary, which not only meets requirements for measurement but also is beneficial to power saving of a terminal.

Based on that, implementations of the disclosure further provide a process of reporting the measurement result at S13 by the terminal device according to the measurement reporting condition in case the uplink measurement configuration information contains the measurement reporting condition.

Figure 4:
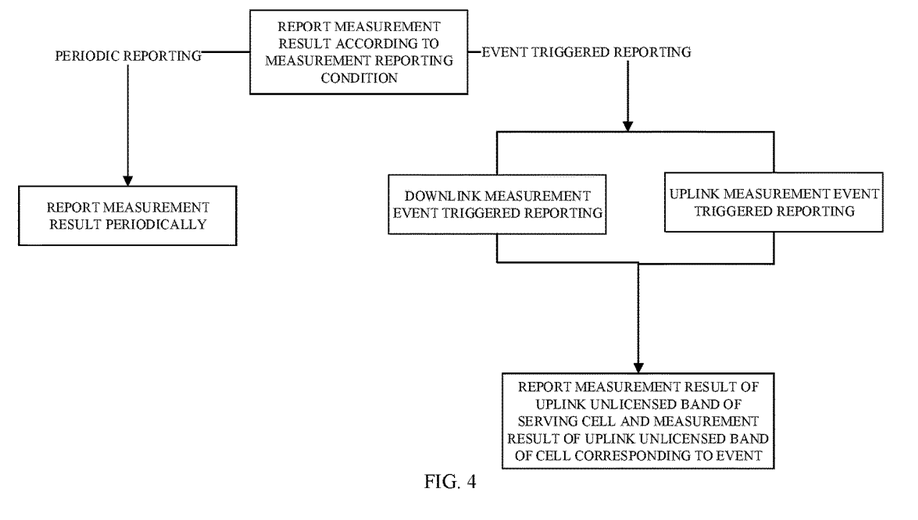
FIG. 4 is a flowchart of a method for measuring an unlicensed band according to an implementation of the disclosure.

FIG. 4 is a flowchart of a method for measuring an unlicensed band according to an implementation of the disclosure. As illustrated in FIG. 4, the terminal device receives a measurement report configuration configured by the network side (such as base station). The measurement reporting condition indicated by the measurement report configuration may be periodic reporting or event triggered reporting, where the event triggered reporting may further include downlink measurement event triggered reporting (that is, reporting triggered by a downlink measurement event) and uplink measurement event triggered reporting (that is, reporting triggered by an uplink measurement event).

In a possible example, when the measurement reporting condition is the event triggered reporting (reporting triggered by an event), the terminal device reports a measurement result of the uplink unlicensed band of the serving cell and a measurement result of an uplink unlicensed band of a cell corresponding to the event. It is to be noted that, when the cell corresponding to the event is a serving cell where the terminal is located, the terminal device can report only the measurement result of the uplink unlicensed band of the serving cell without repeated reporting.

In a possible example, when triggered by a downlink measurement event, the terminal device reports the measurement result of the uplink unlicensed band of the serving cell and a measurement result of an uplink unlicensed band of a cell corresponding to the downlink measurement event. The downlink measurement event may include, but is not limited to, the following A1 event, A2 event, A3 event, A4 event, A5 event, and A6 event. A1 event is that the quality of the downlink reference signal of the serving cell is higher than a threshold value; A2 event is that the quality of the downlink reference signal of the serving cell is lower than a threshold value; A3 event is that the quality of a downlink reference signal of the neighbor cell is higher than that of the serving cell by an offset; A4 event is that the quality of the downlink reference signal of the neighbor cell is lower than a threshold value; A5 event is the quality of a downlink reference signal of a special cell is lower than threshold value 1 and the quality of the downlink reference signal of the neighbor cell is higher than threshold value 2; A6 event is that the quality of the downlink reference signal of the neighbor cell is higher than that of a secondary cell (scell) by an offset.

For example, if downlink measurement triggers A1 event, the terminal device reports the measurement result of the uplink unlicensed band of the serving cell. If downlink measurement triggers A3 event, the terminal device reports a measurement result of an uplink unlicensed band of a neighbor cell corresponding to A3 event and the measurement result of the uplink unlicensed band of the serving cell.

In a possible implementation, when triggered by a downlink measurement event, the terminal device reports the measurement result of the uplink unlicensed band of the serving cell and a measurement result of an uplink unlicensed band of a cell corresponding to the downlink measurement event while reporting a downlink measurement result. The measurement result of the uplink unlicensed band may include at least one of: the RSSI value, the channel occupancy value, or the RSRQ value. The downlink measurement result may include at least one of: an RSRP value or the RSRQ value.

In a possible implementation, the network side can specify which downlink measurement event triggers reporting of the measurement result of the uplink unlicensed band. For example, the base station can indicate that the terminal device reports the measurement result of the uplink unlicensed band while reporting the downlink measurement result if A2 event and A3 event are satisfied.

In a possible implementation, the terminal device can report the measurement result of the uplink unlicensed band while reporting periodically the downlink measurement result. In addition, the terminal device can report the measurement result of the uplink unlicensed band of the cell corresponding to the downlink measurement event.

As such, the terminal device reports the measurement result of the uplink unlicensed band while reporting the downlink measurement result. The base station can obtain both an uplink measurement result and the downlink measurement result, which is possible to obtain more accurately signal quality and interference condition of a wireless environment of the terminal, thereby carrying out an RRM policy more properly.

In a possible implementation, when triggered by an uplink measurement event, the terminal reports the measurement result of the uplink unlicensed band of the serving cell and a measurement result of an uplink unlicensed band of a cell corresponding to the uplink measurement event. The network side transmits the uplink measurement event to the terminal device through an RRC dedicated message or public message, that is, the terminal device reports the measurement result when the obtained measurement result of the uplink unlicensed band matches a corresponding event. The uplink measurement event that triggers reporting of the measurement result may include one or more of the following events. Event X1: the measurement result of the uplink unlicensed band of the serving cell is higher than a threshold value; event X2: the measurement result of the uplink unlicensed band of the serving cell is lower than a threshold value; event X3: the measurement result of the uplink unlicensed band of the neighbor cell is lower than that of the serving cell by an offset; event X4: the measurement result of uplink unlicensed band of the neighbor cell is lower than a threshold value; event X5: a measurement result of an uplink unlicensed band of a special cell is higher than threshold value 1 and the measurement result of the uplink unlicensed band of the neighbor cell is lower than threshold value 2; and event X6: the measurement result of the uplink unlicensed band of the neighbor cell is lower than that of an scell by an offset.

For example, if uplink measurement triggers event X1, the terminal device reports the measurement result of the uplink unlicensed band of the serving cell. If uplink measurement triggers event X3, the terminal reports a measurement result of an uplink unlicensed band of a neighbor cell corresponding to event X3 and the measurement result of the uplink unlicensed band of the serving cell.

In a possible implementation, while reporting the measurement result of the uplink unlicensed band of the serving cell and a measurement result of an uplink unlicensed band of a cell corresponding to an uplink measurement event when triggered by the uplink measurement event, the terminal device can report a measurement result of a downlink reference signal of the serving cell and a measurement result of a downlink reference signal of the cell corresponding to the uplink measurement event. The measurement result of the uplink unlicensed band may include at least one of: the RSSI value, the channel occupancy value, or the RSRQ value. A downlink measurement result may include at least one of: an RSRP value or the RSRQ value.

In a possible implementation, when the measurement reporting condition is the periodic reporting, the terminal device can report periodically the measurement result according to received period information configured by the network side. Exemplarily, the network side transmits a reporting period to the terminal through an RRC dedicated message or public message. If a period configured by the network side is 10 ms (millisecond), the terminal device reports an uplink measurement result every 10 ms.

As such, the terminal device receives a period or event for uplink measurement reporting configured by the network side and reports the uplink measurement result, thereby realizing separate reporting of the uplink measurement result. The network side can obtain the uplink measurement result according to actual needs without binding it with the downlink measurement result.

Figure 5:
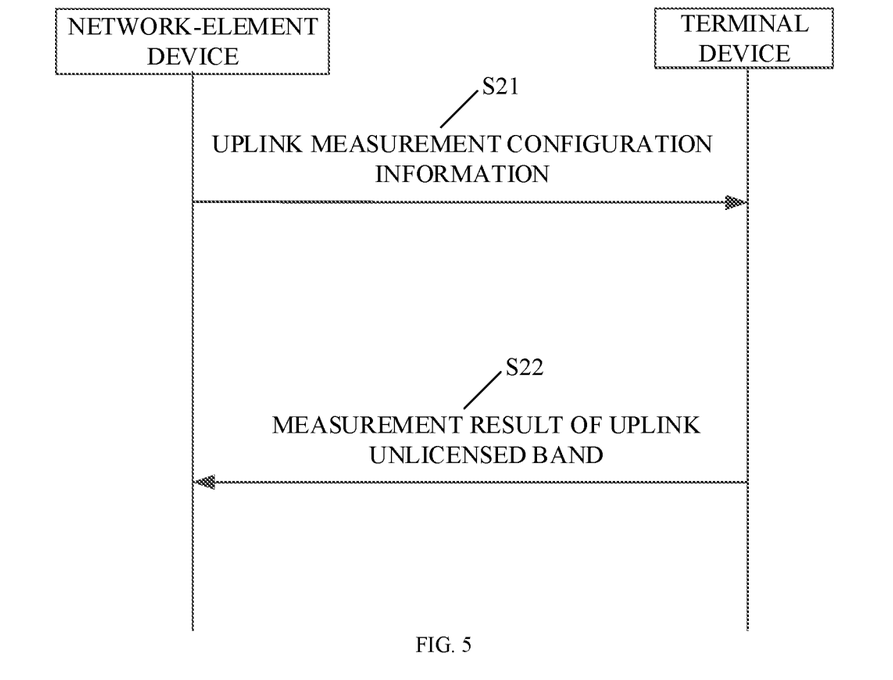
FIG. 5 is a flowchart of a method for measuring an unlicensed band according to an implementation of the disclosure.

FIG. 5 is a flowchart of a method for measuring an unlicensed band according to an implementation of the disclosure. As illustrated in FIG. 5, the method is applicable to a network-element device. The method may include the following steps.

In S21, the network-element device transmits uplink measurement configuration information to a terminal device.

The network-element device (such as base station) configures the uplink measurement configuration information for the terminal device. For example, the base station may transmit the uplink measurement configuration information through an RRC message, and a terminal may receive the uplink measurement configuration information through the RRC message. The uplink measurement configuration information may include one or more of a measurement object, a measurement start condition, and a measurement report configuration. The measurement object may indicate information of a frequency and/or band to be measured. The measurement start condition may indicate a condition for the terminal device to start measuring an uplink unlicensed band. The measurement report configuration may indicate a measurement reporting condition and/or a measurement type. Exemplarily, the measurement reporting condition described above may include at least one of periodic reporting or event triggered reporting. The measurement type may include at least one of: an RSSI value, a channel occupancy value, or an RSRQ value.

In S22, the network-element device receives a measurement result of an uplink unlicensed band transmitted by the terminal device.

The base station may receive the measurement report of the uplink unlicensed band reported by the terminal device. The base station can receive a measurement result of an uplink unlicensed band of a serving cell reported by the terminal device, or may receive a measurement result of an uplink unlicensed band of a serving cell and a measurement result of an uplink unlicensed band of a neighbor cell reported by the terminal device, according to the uplink measurement configuration information. The measurement result includes least one of an RSSI value, a channel occupancy value, or an RSRQ value.

In a possible implementation, the base station may receive a measurement result of an uplink unlicensed band reported by the terminal device, according to the measurement reporting condition in the uplink measurement configuration information. For example, the base station may receive the measurement result of the uplink unlicensed band reported by the terminal device, in case of periodic reporting by the terminal device or trigger by an event. As such, the base station can receive the measurement result of the uplink unlicensed band when necessary, which not only meets requirements of the base station but also is beneficial to power saving of a terminal.

In this way, the base station transmits the uplink measurement configuration information to the terminal device, and receives the measurement result of the uplink unlicensed band reported by the terminal device. As such, it is possible to provide sufficient measurement information to the network side in order for the network side to make an RRM decision such as switching decision, multi-connection processing, etc.

In a possible implementation, in case of reporting triggered by an event (event triggered reporting), the base station can receive the measurement result of the uplink unlicensed band of the serving cell and a measurement result of an uplink unlicensed band of a cell corresponding to the event reported by the terminal device. The event triggered reporting may further include downlink measurement event triggered reporting and uplink measurement event triggered reporting.

In a possible implementation, in case of trigger by a downlink measurement event, the base station can receive the measurement result of the uplink unlicensed band of the serving cell and a measurement result of an uplink unlicensed band of a cell corresponding to the downlink measurement event reported by the terminal device.

In a possible implementation, in case of trigger by a downlink measurement event, the base station can receive the measurement result of the uplink unlicensed band of the serving cell and a measurement result of an uplink unlicensed band of a cell corresponding to the downlink measurement event reported by the terminal device while receiving a downlink measurement result.

As such, the base station can receive the measurement result of the uplink unlicensed band while receiving the downlink measurement result. The base station can obtain both an uplink measurement result and the downlink measurement result, which is possible to obtain more accurately signal quality and interference condition of a wireless environment of the terminal, thereby carrying out an RRM policy more properly.

In a possible implementation, in case of trigger by an uplink measurement event, the base station receives the measurement result of the uplink unlicensed band of the serving cell and a measurement result of an uplink unlicensed band of a cell corresponding to the uplink measurement event reported by the terminal device.

In a possible implementation, while receiving the measurement result of the uplink unlicensed band of the serving cell and a measurement result of an uplink unlicensed band of a cell corresponding to an uplink measurement event reported by the terminal device in case of trigger by the uplink measurement event, the base station can receive a measurement result of a downlink reference signal of the serving cell and a measurement result of a downlink reference signal of the cell corresponding to the uplink measurement event.

In a possible implementation, when the measurement reporting condition is the periodic reporting, the base station can receive the measurement result of the uplink unlicensed band periodically. The base station may receive the measurement result reported periodically by the terminal device, according to period information configured by the network side. Exemplarily, the network side transmits a reporting period to the terminal through an RRC dedicated message or public message. If a period configured by the network side is 10 ms, the base station receives every 10 ms the uplink measurement result reported by the terminal device.

As such, the base station configures for the terminal device a period or event for uplink measurement reporting and receives the uplink measurement result, thereby realizing separate reception of the uplink measurement result. The network side can obtain the uplink measurement result according to actual needs without binding it with the downlink measurement result.

Figure 6:
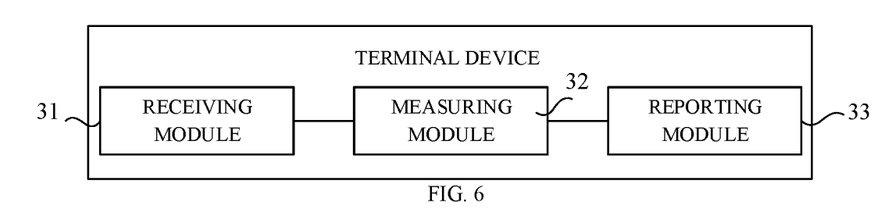
FIG. 6 is a structural diagram of a terminal device for measuring an unlicensed band according to an implementation of the disclosure.

FIG. 6 is a structural diagram of a terminal device for measuring an unlicensed band according to an implementation of the disclosure. As illustrated in FIG. 6, the terminal device includes a receiving module 31, a measuring module 32, and a reporting module 33. The receiving module 31 is configured for the terminal device to receive uplink measurement configuration information. The measuring module 32 is configured for the terminal device to measure an uplink unlicensed band to obtain a measurement result. The reporting module 33 is configured for the terminal device to report the measurement result.

In a possible implementation, the uplink measurement configuration information includes at least one of a measurement object, a measurement start condition, or a measurement report configuration. The measurement object indicates information of a frequency and/or band to be measured. The measurement start condition indicates a condition for the terminal device to start measuring an uplink unlicensed band. The measurement report configuration indicates a measurement reporting condition and/or a measurement type.

In a possible implementation, the measuring module 32 may include a first measuring unit. The first measuring unit is configured for the terminal device to measure an uplink unlicensed band of a serving cell according to the uplink measurement configuration information.

In a possible implementation, the measuring module 32 may further include a second measuring unit. The second measuring unit is configured for the terminal device to measure an uplink unlicensed band of a serving cell and an uplink unlicensed band of a neighbor cell according to the uplink measurement configuration information.

In a possible implementation, the measuring module 32 may further include a third measuring unit. The third measuring unit is configured for the terminal device to start measuring an uplink unlicensed band of a serving cell when the measurement start condition is satisfied.

In a possible implementation, the measuring module 32 may further include a fourth measuring unit. The fourth measuring unit is configured for the terminal device to start measuring an uplink unlicensed band of a serving cell and an uplink unlicensed band of a neighbor cell when the measurement start condition is satisfied.

In a possible implementation, the third measuring unit may include a first measurement-starting subunit. The first measurement-starting subunit is configured for the terminal device to measure an RSRP and/or an RSRQ of a downlink reference signal of the serving cell, and start measuring the uplink unlicensed band of the serving cell when the RSRP and/or the RSRQ of the downlink reference signal is lower than a first threshold.

In a possible implementation, the third measuring unit may further include a second measurement-starting subunit. The second measurement-starting subunit is configured for the terminal device to measure an RSRP and/or an RSRQ of an uplink reference signal of the serving cell, and start measuring the uplink unlicensed band of the serving cell when the RSRP and/or the RSRQ of the uplink reference signal is lower than a third threshold.

In a possible implementation, the fourth measuring unit may include a third measurement-starting subunit. The third measurement-starting subunit is configured for the terminal device to measure an RSRP and/or an RSRQ of a downlink reference signal of the serving cell, and start measuring the uplink unlicensed band of the serving cell and the uplink unlicensed band of the neighbor cell when the RSRP and/or the RSRQ of the downlink reference signal is lower than a second threshold.

In a possible implementation, the fourth measuring unit may further include a fourth measurement-starting subunit. The fourth measurement-starting subunit is configured for the terminal device to measure an RSRP and/or an RSRQ of an uplink reference signal of the serving cell, and start measuring the uplink unlicensed band of the serving cell and the uplink unlicensed band of the neighbor cell when the RSRP and/or the RSRQ of the uplink reference signal is lower than a fourth threshold.

In a possible implementation, the fourth measuring unit may further include a fifth measurement-starting subunit. The fifth measurement-starting subunit is configured for the terminal device to start measuring an RSSI value of the uplink unlicensed band of the serving cell, after receiving the uplink measurement configuration information, and start measuring the uplink unlicensed band of the neighbor cell when the RSSI value of the uplink unlicensed band is greater than a fifth threshold.

In a possible implementation, the fourth measuring unit may further include a sixth measurement-starting subunit. The sixth measurement-starting subunit is configured for the terminal device to start measuring a channel occupancy value of the uplink unlicensed band of the serving cell, after receiving the uplink measurement configuration information, and start measuring the uplink unlicensed band of the neighbor cell when the channel occupancy value of the uplink unlicensed band is greater than a sixth threshold.

In a possible implementation, the reporting module 33 may include a first reporting unit. The first reporting unit is configured for the terminal device to report a measurement result of a serving cell.

In a possible implementation, the reporting module 33 may include a second reporting unit. The second reporting unit is configured for the terminal device to report the measurement result according to the measurement reporting condition.

In a possible implementation, the second reporting unit may include a periodic-reporting subunit. The periodic-reporting subunit is configured for the terminal device to report periodically the measurement result according to period information received, when the measurement reporting condition is periodic reporting.

In a possible implementation, the second reporting unit may further include an event-triggered-reporting subunit. The event-triggered-reporting subunit is configured for the terminal device to report a measurement result of an uplink unlicensed band of a serving cell and a measurement result of an uplink unlicensed band of a cell corresponding to an event when triggered by the event, in case the measurement reporting condition is event triggered reporting.

In a possible implementation, the event-triggered-reporting subunit may be further configured for the terminal device to report the measurement result of the uplink unlicensed band of the serving cell and a measurement result of an uplink unlicensed band of a cell corresponding to a downlink measurement event when triggered by the downlink measurement event.

In a possible implementation, the event-triggered-reporting subunit may be further configured for the terminal device to report the measurement result of the uplink unlicensed band of the serving cell and a measurement result of an uplink unlicensed band of a cell corresponding to a downlink measurement event while reporting a downlink measurement result, when triggered by the downlink measurement event.

In a possible implementation, the event-triggered-reporting subunit may be further configured for the terminal device to report the measurement result of the uplink unlicensed band of the serving cell and a measurement result of an uplink unlicensed band of a cell corresponding to an uplink measurement event when triggered by the uplink measurement event.

In a possible implementation, the event-triggered-reporting subunit may be further configured for the terminal device to report a measurement result of a downlink reference signal of the serving cell and a measurement result of a downlink reference signal of a cell corresponding to an uplink measurement event, while reporting the measurement result of the uplink unlicensed band of the serving cell and a measurement result of an uplink unlicensed band of the cell corresponding to the uplink measurement event when triggered by the uplink measurement event.

In a possible implementation, the measurement result may include at least one of: the RSSI value, the channel occupancy value, or an RSRQ value.

Figure 7:
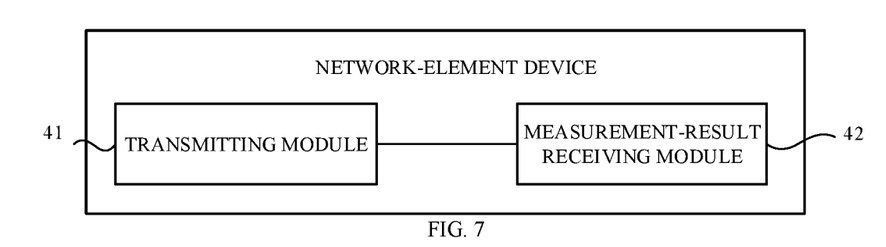
FIG. 7 is a structural diagram of a network-element device for measuring an unlicensed band according to an implementation of the disclosure.

FIG. 7 is a structural diagram of a network-element device for measuring an unlicensed band according to an implementation of the disclosure. As illustrated in FIG. 7, the network-element device includes a transmitting module 41 and a measurement-result receiving module 42. The transmitting module 41 is configured for the network-element device to transmit uplink measurement configuration information. The measurement-result receiving module 42 is configured for the network-element device to receive a measurement result of an uplink unlicensed band.

In a possible implementation, the transmitting module 41 may be further configured for the network-element device (such as base station) to transmit the uplink measurement configuration information through an RRC message.

In a possible implementation, the uplink measurement configuration information may include at least one of a measurement object, a measurement start condition, or a measurement report configuration. The measurement object indicates information of a frequency and/or band to be measured by a terminal. The measurement start condition indicates a condition for a terminal device to start measuring an uplink unlicensed band. The measurement report configuration indicates a measurement reporting condition and/or a measurement type.

In a possible implementation, the measurement-result receiving module 42 may include a first measurement-result receiving unit. The first measurement-result receiving unit is configured for the base station to receive a measurement result of an uplink unlicensed band of a serving cell according to the uplink measurement configuration information.

In a possible implementation, the measurement-result receiving module 42 may further include a second measurement-result receiving unit. The second measurement-result receiving unit is configured for the base station to receive a measurement result of an uplink unlicensed band of a serving cell and a measurement result of an uplink unlicensed band of a neighbor cell according to the uplink measurement configuration information.

In a possible implementation, the measurement-result receiving module 42 may further include a third measurement-result receiving unit. The third measurement-result receiving unit is configured for the base station to receive the measurement result of an uplink unlicensed band according to the measurement reporting condition.

In a possible implementation, the third measurement-result receiving unit may include a periodic-reception subunit. The periodic-reception subunit is configured for the base station to receive periodically the measurement result of an uplink unlicensed band in case of periodic reporting by a terminal.

In a possible implementation, the third measurement-result receiving unit may further include an event-triggered-reception subunit. The event-triggered-reception subunit is configured for the base station to receive a measurement result of an uplink unlicensed band of a serving cell and a measurement result of an uplink unlicensed band of a cell corresponding to an event in case of reporting by a terminal triggered by the event (event-triggered reporting by the terminal).

In a possible implementation, the event-triggered-reception subunit is further configured for the base station to receive the measurement result of the uplink unlicensed band of the serving cell and a measurement result of an uplink unlicensed band of a cell corresponding to a downlink measurement event reported by a terminal device, in case of trigger by the downlink measurement event.

In a possible implementation, the event-triggered-reception subunit is further configured for the base station to receive the measurement result of the uplink unlicensed band of the serving cell and a measurement result of an uplink unlicensed band of a cell corresponding to a downlink measurement event reported by a terminal while receiving a downlink measurement result reported by a terminal device, in case of trigger by the downlink measurement event.

In a possible implementation, the event-triggered-reception subunit is further configured for the base station to receive the measurement result of the uplink unlicensed band of the serving cell and a measurement result of an uplink unlicensed band of a cell corresponding to an uplink measurement event reported by a terminal device, in case of trigger by the uplink measurement event.

In a possible implementation, the event-triggered-reception subunit is further configured for the base station to receive a measurement result of a downlink reference signal of the serving cell and a measurement result of a downlink reference signal of a cell corresponding to an uplink measurement event reported by a terminal device, while receiving the measurement result of the uplink unlicensed band of the serving cell and a measurement result of an uplink unlicensed band of the cell corresponding to the uplink measurement event reported by the terminal device in case of trigger by the uplink measurement event.

In a possible implementation, the measurement result of an uplink unlicensed band may include at least one of: an RSSI value, a channel occupancy value, or an RSRQ value.

Figure 8:
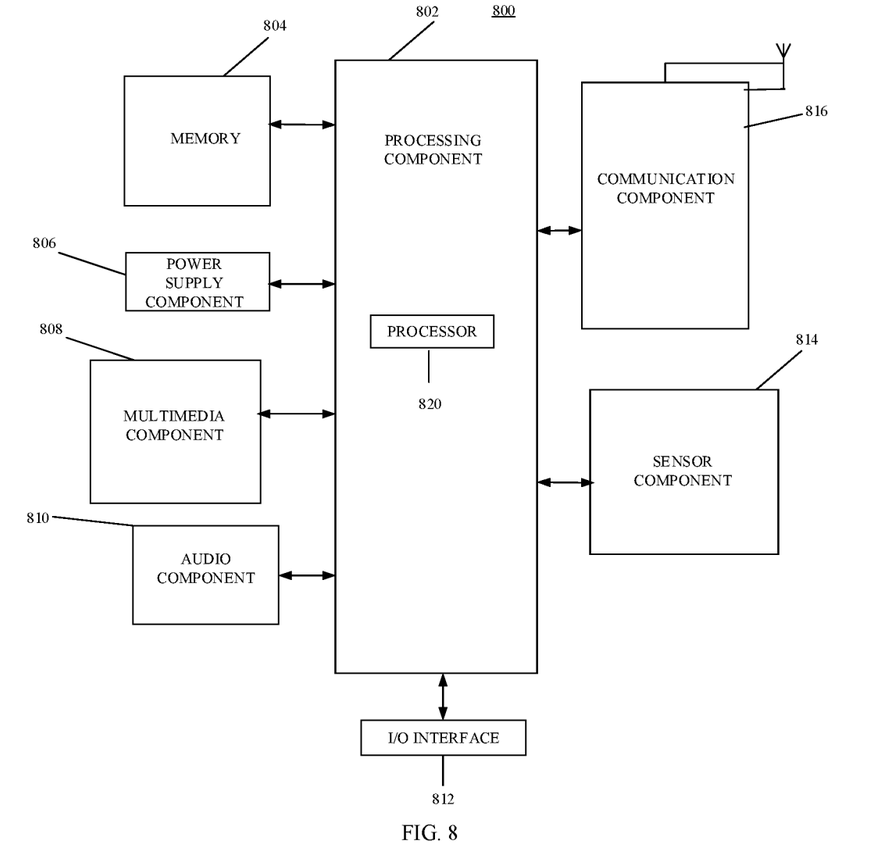
FIG. 8 is a block diagram of a terminal device for measuring an unlicensed band according to an implementation of the disclosure.

FIG. 8 is a block diagram of a terminal device 800 for measuring an unlicensed band according to an implementation of the disclosure. Referring to FIG. 8, the terminal device 800 may include one or more of the following components: a processing component 802, a memory 804, a power supply component 806, a multimedia component 808, an audio component 810, an input/output (I/O) interface 812, a sensor component 814, and a communication component 1016.

The processing component 802 typically controls the overall operation of the terminal device 800, such as operations associated with display, telephone call, data communication, camera operation, and recording operation. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations in the device 800. Examples of these data include instructions for any application or method operated on the terminal device 800, contact data, phonebook data, messages, pictures, videos, and the like. The memory 804 may be implemented by any type of transitory or non-transitory storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk, or optical disk.

The power supply assembly 806 provides power to various components of the terminal device 800. The power component 806 may include a power management system, one or more power supplies, and other components associated with generating, managing, and allocating power for the terminal device 800.

The multimedia component 808 includes a screen providing an output interface between the terminal device 800 and a user. In some implementations, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding and gestures on the touch panel. The touch sensor can not only sense the boundary of the touch or slide operation, but also detect the duration and pressure related to the touch or slide operation. In some implementations, the multimedia component 808 includes a front camera and/or a rear camera. When the terminal device 800 is in an operation mode, such as shooting mode or video mode, the front camera and/or rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC) configured to receive an external audio signal when the terminal device 800 is in an operation mode, such as a call mode, a recording mode, and a speech recognition mode. The received audio signal may be further stored in the memory 804 or transmitted via the communication component 816. In some implementations, the audio component 810 also includes a speaker for outputting an audio signal.

The I/O interface 812 provides an interface between the processing component 802 and a peripheral interface module. The peripheral interface module can be a keyboard, click wheel, button, etc. These buttons may include but are not limited to: home button, volume button, start button, and lock button.

The sensor assembly 814 includes one or more sensors for providing state evaluation on various aspects for the terminal device 800. For example, the sensor assembly 814 may detect an on/off state of the terminal device 800 and the relative positioning of the components. For example, the components are the display and keypad of the terminal device 800. The sensor component 814 can also detect position change of the terminal device 800 or one component of the terminal device 800, presence or absence of user contact with the terminal device 800, orientation or acceleration/deceleration of the terminal device 800, and temperature change of the terminal device 800. The sensor assembly 814 may include a proximity sensor configured to detect presence of nearby objects without any physical contact. The sensor assembly 814 may further include an optical sensor, such as a complementary metal oxide semiconductor (CMOS) or charge-coupled device (CCD) image sensor, for use in imaging applications. In some implementations, the sensor assembly 814 may also include an acceleration sensor, a gyroscope sensor, a magnetic sensor, a pressure sensor, or a temperature sensor.

The communication component 816 is configured to facilitate wired or wireless communication between the terminal device 800 and other devices. The terminal device 800 may access a wireless network based on a communication standard, such as wireless fidelity (WiFi), the 2nd generation (2G) or the 3rd generation (3G), or a combination thereof. In an exemplary implementation, the communication component 816 receives a broadcast signal or broadcast related information from an external broadcast management system via a broadcast channel. In an exemplary implementation, the communication component 816 also includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In an exemplary implementation, the terminal device 800 may be implemented by one or more application specific integrated circuits (ASIC), digital signal processors (DSPS), digital signal processing devices (DSPD), programmable logic devices (PLD), field programmable gate arrays (FPGA), controllers, microcontrollers, microprocessors, or other electronic components for performing the above methods.

In an exemplary implementation, a non-transitory computer readable storage medium is further provided, for example, a memory 804 storing computer program instructions. The computer program instructions are operable with a processor 820 of the terminal device 800 to perform the above methods.

Figure 9:
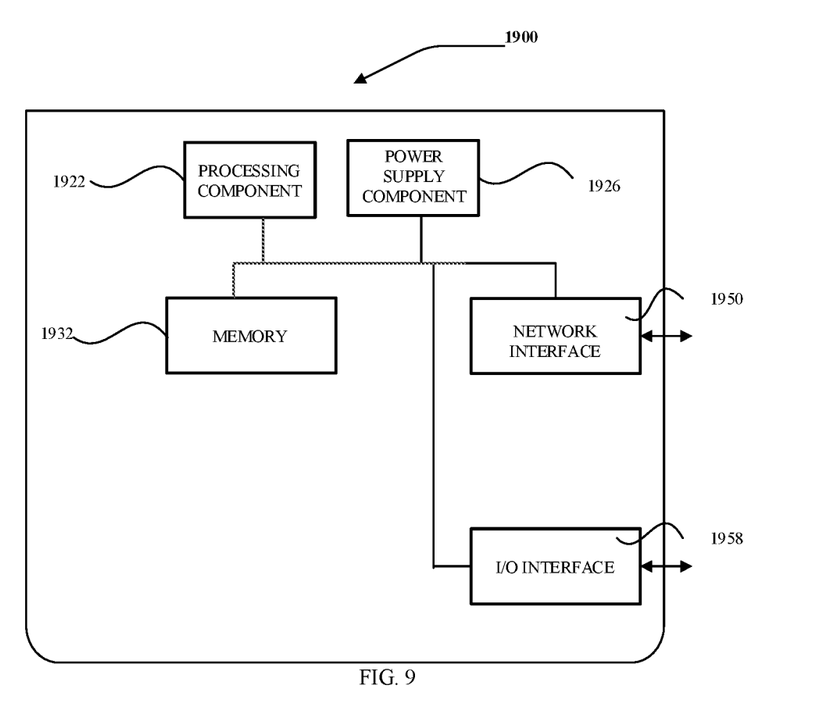
FIG. 9 is a block diagram of a network-element device for measuring an unlicensed band according to an implementation of the disclosure.

FIG. 9 is a block diagram of a network-element device for measuring an unlicensed band according to an implementation of the disclosure. For example, the network-element device 1900 can be provided as a server. Referring to FIG. 9, the network-element device 1900 includes a processing component 1922, which further includes one or more processors as well as memory resources represented by a memory 1932 and configured to store instructions (such as applications) executable with the processing component 1922. The application stored in the memory 1932 may include one or more modules, each corresponding to a set of instructions. In addition, the applications stored in the processing component 1922 is configured to carry out instructions to perform the above methods.

The network-element device 1900 may further include a power supply component 1926 configured to perform power management of the network-element device 1900, a wired or wireless network interface 1950 configured to connect the network-element device 1900 to the network, and an I/O interface 1958. The network-element device 1900 may operate an operating system stored in the memory 1932, such as Windows Server™, Mac OS X™, Unix™, Linux™, FreeBSD™, etc.

In an exemplary implementation, a non-transitory computer readable storage medium is provided, such as the memory 1932 storing computer program instructions. The computer program instructions can be carried out by the processing component 1922 of the network-element device 1900 to perform the above methods.

This disclosure can be a system, a method, and/or a computer program product. The computer program product includes a computer readable storage medium, which carries computer readable program instructions for a processor to implement various aspects of the disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of a computer-readable storage medium include: portable computer disk, hard disk, random access memory (RAM), read only memory (ROM), erasable programmable ROM (EPROM or flash memory), static RAM (SRAM), portable compact disk ROM (CD-ROM), digital multifunction disk (DVD), a memory stick, a floppy disk, a mechanical encoding device, such as a punch card or a convex structure in a groove on which instructions are stored, and any suitable combination of the above. The computer-readable storage medium used herein is not interpreted as an instantaneous signal itself, such as a radio wave or other freely propagating electromagnetic wave, an electromagnetic wave propagating through a waveguide or other transmission medium (for example, an optical pulse through an optical fiber cable), or an electrical signal transmitted through a wire.

The computer-readable program instructions described herein may be downloaded from a computer-readable storage medium to various computing/processing devices, or to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network and forwards the computer-readable program instructions to be stored in the computer-readable storage medium in each computing/processing device.

The computer program instructions for performing the operations of the disclosure may be assembly instructions, instruction set architecture (ISA) instructions, machine instructions, machine related instructions, microcode, firmware instructions, status setting data, or source code or object code written in any combination of one or more programming languages. The programming languages include object-oriented programming languages such as Smalltalk, C++, etc., and conventional procedural programming languages such as "C" language or similar programming languages. Computer readable program instructions may be executed completely on a user's computer, partially on the user's computer, as a separate software package, partially on the user's computer and partially on a remote computer, or completely on the remote computer or server. In the case of the remote computer, the remote computer may be connected to the user computer through any kind of network, including a LAN or a WAN, or may be connected to an external computer (for example, connected through an Internet via an Internet service provider). In some implementations, an electronic circuit such as a programmable logic circuit, a field programmable gate array (FPGA), or a programmable logic array (PLA) can be personalized by utilizing the state information of computer-readable program instructions. The electronic circuit can carry out computer readable program instructions, so as to implement various aspects of the disclosure.

Various aspects of the disclosure are described herein with reference to flowcharts and/or block diagrams of methods, devices (systems) and computer program products according to implementations of the disclosure. It should be understood that each block of a flowchart and/or block diagram and a combination of blocks in the flowchart and/or block diagram may be implemented by computer-readable program instructions.

These computer-readable program instructions can be provided to a processor of a general-purpose computer, a special-purpose computer, or other programmable data processing devices, so as to produce a machine so that when these instructions are executed by a processor of a computer or other programmable data processing devices, a device is generated to realize the functions/actions specified in one or more blocks in the flowchart and/or block diagram. These computer-readable program instructions may also be stored in a computer-readable storage medium, to cause computers, programmable data processing devices, and/or other devices to operate in a specific manner, so that the computer-readable medium in which the instructions are stored includes a manufacture which includes instructions to implement various aspects of the functions/actions specified in one or more blocks in the flowchart and/or block diagram.

Computer readable program instructions may also be loaded onto a computer, other programmable data processing devices, or other devices, so that a series of operation steps are performed on the computer, other programmable data processing device, or other devices to generate a computer implemented process, so that instructions executed in the computer, other programmable data processing device, or other devices can realize the functions/actions specified in one or more blocks in the flowchart and/or block diagram.

The flowchart and block diagram in the accompanying drawings show the architecture, functions and operations of possible implementations of systems, methods and computer program products according to various implementations of the disclosure. In this regard, each block in the flowchart or block diagram may represent a part of a module, program segment, or instruction containing one or more executable instructions for realizing a specified logical function. In some alternative implementations, the functions marked in the blocks may also occur in a different order than those marked in the drawings. For example, two consecutive blocks can actually be executed basically in parallel, and they sometimes can be executed in the opposite order, depending on the function involved. It should also be noted that each block in the block diagram and/or flowchart and the combination of blocks in the block diagram and/or flowchart can be realized by a dedicated hardware based system performing specified functions or actions, or by a combination of dedicated hardware and computer instructions.

It should be understood that, the term "and/or" in implementations of the disclosure only describes an association relationship between associated objects, which means that there can be three relationships. For example, A and/or B can mean A alone, both A and B exist, and B alone. In addition, the character "/" herein generally indicates that the associated objects are in an "or" relationship. The term "multiple" in implementations of the disclosure refers to two or more than two. The terms "first", "second", and the like in implementations of the disclosure are merely used for illustration and distinguishing similar objects rather than describing a specific order or sequence, and also do not represent specific limitation on the number of devices in implementations of the disclosure, which shall not constitute any limitation on implementations of the disclosure. The term "connection" in implementations of the disclosure refers to various connection manners such as direct connection or indirect connection for communication between devices, and implementations of the disclosure are not limited in this regard.

Various implementations of the present disclosure have been described above, and the above description is exemplary rather than exhaustive, and is not limited to the various implementations disclosed. Without departing from the scope and spirit of the various implementations described, many modifications and changes are obvious to those skilled in the art. The terms used herein are selected to best explain the principle, practical application, or improvement of the technology in the market of each implementation, or to enable other ordinary skilled person in the art to understand the various implementations disclosed herein.

What is claimed is:

1. A method for measuring an unlicensed band, the method comprising:
receiving uplink measurement configuration information;
measuring an uplink unlicensed band to obtain a measurement result; and
reporting the measurement result;
wherein the measuring the uplink unlicensed band to obtain the measurement result comprises:
measuring a reference signal receiving power (RSRP) and/or a reference signal receiving quality (RSRQ) of a downlink reference signal of a serving cell, and
starting measuring the uplink unlicensed band of the serving cell in response to the RSRP and/or the RSRQ of the downlink reference signal being lower than a first threshold.

2. The method of claim 1, wherein the uplink measurement configuration information comprises at least one of a measurement object, a measurement start condition, or a measurement report configuration, wherein
  the measurement object indicates information of a frequency and/or band to be measured;
  the measurement start condition indicates a condition for starting measuring an uplink unlicensed band; and
  the measurement report configuration indicates a measurement reporting condition and/or a measurement type.

3. The method of claim 2, wherein the measurement start condition is the RSRP and/or the RSRQ of the downlink reference signal being lower than the first threshold.

4. The method of claim 2, wherein reporting the measurement result comprises:
  reporting the measurement result according to the measurement reporting condition.

5. The method of claim 4, wherein
  in response to the measurement reporting condition being periodic reporting, reporting the measurement result according to the measurement reporting condition comprises:
    reporting periodically the measurement result according to period information received;
  in response to the measurement reporting condition being event triggered reporting, reporting the measurement result according to the measurement reporting condition comprises:
    reporting a measurement result of an uplink unlicensed band of a serving cell and a measurement result of an uplink unlicensed band of a cell corresponding to an event in response to triggered by the event.

6. The method of claim 5, wherein reporting the measurement result of the uplink unlicensed band of the serving cell and the measurement result of the uplink unlicensed band of the cell corresponding to the event in response to triggered by the event comprises:
  reporting the measurement result of the uplink unlicensed band of the serving cell and a measurement result of an uplink unlicensed band of a cell corresponding to a downlink measurement event in response to triggered by the downlink measurement event; or
  reporting the measurement result of the uplink unlicensed band of the serving cell and a measurement result of an uplink unlicensed band of a cell corresponding to a downlink measurement event while reporting a downlink measurement result, in response to triggered by the downlink measurement event; or
  reporting the measurement result of the uplink unlicensed band of the serving cell and a measurement result of an uplink unlicensed band of a cell corresponding to an uplink measurement event in response to triggered by the uplink measurement event; or
  reporting a measurement result of a downlink reference signal of the serving cell and a measurement result of a downlink reference signal of a cell corresponding to an uplink measurement event, while reporting the measurement result of the uplink unlicensed band of the serving cell and a measurement result of an uplink unlicensed band of the cell corresponding to the uplink measurement event in response to triggered by the uplink measurement event.

7. The method of claim 1, wherein reporting the measurement result comprises:
  reporting a measurement result of a serving cell.

8. The method of claim 1, wherein the measurement result comprises at least one of: the RSSI value, the channel occupancy value, or an RSRQ value.

9. A method for measuring an unlicensed band, the method comprising:
  transmitting uplink measurement configuration information; and
  receiving a measurement result of an uplink unlicensed band,
  wherein the uplink measurement configuration information comprises a measurement start condition, and
  wherein the measurement start condition comprises: starting measuring an uplink unlicensed band of the serving cell in response to a reference signal receiving power (RSRP) and/or a reference signal receiving quality (RSRQ) of a downlink reference signal being lower than a first threshold.

10. The method of claim 9, wherein transmitting the uplink measurement configuration information comprises:
  transmitting the uplink measurement configuration information through a radio resource control (RRC) message.

11. The method of claim 9, wherein the uplink measurement configuration information further comprises at least one of a measurement object or a measurement report configuration, wherein
  the measurement object indicates information of a frequency and/or band to be measured;
  the measurement start condition indicates a condition for starting measuring an uplink unlicensed band; and
  the measurement report configuration indicates a measurement reporting condition and/or a measurement type.

12. The method of claim 11, wherein receiving the measurement result of an uplink unlicensed band comprises:
  receiving the measurement result of an uplink unlicensed band according to the measurement reporting condition.

13. The method of claim 12, wherein
  in response to the measurement reporting condition being periodic reporting, receiving the measurement result of an uplink unlicensed band according to the measurement reporting condition comprises:
    receiving periodically the measurement result of an uplink unlicensed band in case of the periodic reporting; and/or
  in response to the measurement reporting condition being event triggered reporting, receiving the measurement result of an uplink unlicensed band according to the measurement reporting condition comprises:
    receiving a measurement result of an uplink unlicensed band of a serving cell and a measurement result of an uplink unlicensed band of a cell corresponding to an event in case of reporting triggered by the event.

14. The method of claim 13, wherein receiving the measurement result of the uplink unlicensed band of the serving cell and the measurement result of the uplink unlicensed band of the cell corresponding to the event in case of reporting triggered by the event comprises:
  receiving the measurement result of the uplink unlicensed band of the serving cell and a measurement result of an uplink unlicensed band of a cell corresponding to a downlink measurement event in case of trigger by the downlink measurement event; or
  receiving the measurement result of the uplink unlicensed band of the serving cell and a measurement result of an uplink unlicensed band of a cell corresponding to a downlink measurement event while receiving a downlink measurement result, in case of trigger by the downlink measurement event; or receiving the measurement result of the uplink unlicensed band of the serving cell and a measurement result of an uplink unlicensed band of a cell corresponding to an uplink measurement event in case of trigger by the uplink measurement event; or receiving a measurement result of a downlink reference signal of the serving cell and a measurement result of a downlink reference signal of a cell corresponding to an uplink measurement event, while receiving the measurement result of the uplink unlicensed band of the serving cell and a measurement result of an uplink unlicensed band of the cell corresponding to the uplink measurement event in case of trigger by the uplink measurement event.

15. The method of claim 9, wherein receiving the measurement result of an uplink unlicensed band comprises:

receiving a measurement result of an uplink unlicensed band of a serving cell according to the uplink measurement configuration information.

16. The method of claim 9, wherein the measurement result of an uplink unlicensed band comprises at least one of: a received signal strength indicator (RSSI) value, a channel occupancy value, or a reference signal receiving quality (RSRQ) value.

17. A terminal device comprising a processor and a memory configured to store instructions executable by the processor, and when executing the executable instructions stored in the memory, the processor being configured to implement:

receiving uplink measurement configuration information;

measuring an uplink unlicensed band to obtain a measurement result; and reporting the measurement result, wherein the processor, configured to implement measuring the uplink unlicensed band to obtain the measurement result, is configured to implement:

measuring a reference signal receiving power (RSRP) and/or a reference signal receiving quality (RSRQ) of a downlink reference signal of a serving cell, and starting measuring the uplink unlicensed band of the serving cell in response to the RSRP and/or the RSRQ of the downlink reference signal being lower than a first threshold.

* * * * *